US006728611B2

(12) United States Patent
Kamiya

(10) Patent No.: US 6,728,611 B2
(45) Date of Patent: Apr. 27, 2004

(54) FAILURE DIAGNOSTIC SYSTEM AND ELECTRONIC CONTROL UNIT FOR USE IN DIAGNOSING FAILURE OF VEHICLE

(75) Inventor: Kenji Kamiya, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/241,474

(22) Filed: Sep. 12, 2002

(65) Prior Publication Data

US 2003/0050747 A1 Mar. 13, 2003

(30) Foreign Application Priority Data

Sep. 12, 2001 (JP) ....................................... 2001-276706

(51) Int. Cl.[7] ............................................... G01M 17/00

(52) U.S. Cl. ........................... 701/33; 701/29; 340/426; 340/438

(58) Field of Search ............................. 701/29, 33, 35, 701/31, 32, 34; 340/426, 438, 439; 324/500; 700/79; 702/108, 182; 714/1, 25

(56) References Cited

U.S. PATENT DOCUMENTS 5,465,613 A * 11/1995 Takaba et al. ............. 73/117.3

6,434,455 B1 * 8/2002 Snow et al. .................. 701/33

FOREIGN PATENT DOCUMENTS

| | | |
|---|---|---|
| JP | 7-281903 | 10/1995 |
| JP | 11-134529 | 5/1999 |
| JP | 2000-131194 | 5/2000 |
| JP | 2000-182188 | 6/2000 |

* cited by examiner

*Primary Examiner*—Marthe Marc-Coleman
(74) *Attorney, Agent, or Firm*—Nixon & Vanderhye P.C.

(57) ABSTRACT

A center stores functional modification information and failure information, which are associated with each other. The modification information is used to store specified vehicle data at specified time. A terminal device transmits failure information to the center and receives analytic information, which includes the corresponding modification information, from the center. Then, the terminal device inquires a software product number of a control program, which includes a diagnostic program, to an ECU and receives a corresponding data assignment table, which corresponds to the software product number, from the center. The terminal device converts the modification information to a form, which is interpretable by the control program, through use of the assignment table and transmits it to the ECU. In the ECU, the modification information is stored in a form of tables, and the diagnostic program is executed to store the vehicle data based on the modification information.

20 Claims, 11 Drawing Sheets

FAILURE DIAGNOSTIC SYSTEM AND ELECTRONIC CONTROL UNIT FOR USE IN DIAGNOSING FAILURE OF VEHICLE

CROSS REFERENCE TO RELATED APPLICATION

This application is based on and incorporates herein by reference Japanese Patent Application No. 2001-276706 filed on Sep. 12, 2001.

BACKGROUND OF THE INVENTION

1. Field of the Invention

The present invention relates to a failure diagnostic system of a vehicle, and more particularly to a technique for storing vehicle operation information.

2. Description of Related Art

Recently, the mechatronics technology, which combines the mechanics technology with the electronics technology, has shown the notable progress as a result of the substantial progress in the electronics technology, such as the advent of high performance microprocessors. As part of the progress in the mechatronics technology, various computer systems have been developed for use in vehicles, such as automobiles. These computer systems are used to achieve an improvement in resource consumption, energy consumption, running performance, safety, comfort or the like and are provided in various systems, such as an engine system, a drive system, a running safety system (e.g., a vehicle stability control system, an anti-lock brake system, etc.), an entertainment system and the like of the vehicle.

Among the various computer systems, a demand for achieving a particularly high reliability has been placed on an electronic control unit for controlling a vehicle. For example, if the electronic control unit fails to detect a failure of one particular part of the vehicle, the vehicle may experience a driving trouble or may not be able to continue its driving. To avoid this, one previously proposed electronic control unit is provided with a diagnostic program for diagnosing each corresponding part of the vehicle to improve reliability. That is, operation of each computer and of each sensor is periodically and automatically checked. When a failure of the vehicle occurs, a diagnostic fault code (SAE code) and vehicle operation information are stored in a memory of the electronic control unit. The vehicle operation information shows a state of operation of the vehicle at the time of occurrence of the failure. The vehicle operation information is generally referred to as freeze frame data (FDD), which is vehicle data corresponding to a parameter identification (PID) specified by the regulation.

A service personnel retrieves the diagnostic fault code and the vehicle operation information stored in the electronic control unit by connecting a terminal device to the electronic control unit and identifies a failed part of the vehicle based on the diagnostic fault code and the vehicle operation information.

However, it is sometimes difficult to identify the failed part of the vehicle based on the limited vehicle operation information, to which the corresponding PID is assigned. For example, depending on a type of encountered trouble of the vehicle, a value of an internal parameter used in a particular control operation may be required to identify the corresponding failed part of the vehicle, which causes the trouble of the vehicle.

Furthermore, the vehicle operation information is stored in the electronic control unit only when the corresponding diagnostic fault code is stored in the electronic control unit. Since the vehicle operation information is stored only at the limited times, it is sometimes difficult to identify the failed part of the vehicle based on the vehicle operation information. For example, depending on a type of encountered trouble of the vehicle, change in the vehicle operation information within a limited time period may be required.

That is, because of the variations in the occurrence of the trouble of the vehicle, the failed part of the vehicle sometimes cannot be identified based only on the vehicle operation information, to which the corresponding PID is assigned. Thus, the vehicle operation information needs to be stored depending on the circumstances. Furthermore, besides the time of storing the diagnostic fault code, the vehicle operation information is preferably stored at other times as well.

To address the above disadvantage, in one previous proposal, the diagnostic program implemented in the electronic control unit is rewritten individually depending on each encountered trouble of the vehicle. That is, by the modification of the diagnostic program or addition of an analytic program to the diagnostic program, the vehicle operation information, which is required to identify the failed part of the vehicle, can be stored in the electronic control unit at any required time. Then, a reproduction test for reproducing the occurrence of the failure is performed. The service personnel identifies the failed part of the vehicle based on the vehicle operation information stored in the electronic control unit during the reproduction test.

However, the modification or addition of the diagnostic program requires knowledge of the entire diagnostic program, so that the modification or addition of the diagnostic program needs to be performed by an expert. Furthermore, even when the expert modifies or adds the diagnostic program, a debug operation is required in response to the modification or addition of the diagnostic program, so that time required to modify or add the diagnostic program becomes relatively long, causing inconvenience to a user.

SUMMARY OF THE INVENTION

The present invention addresses the above disadvantages. Thus, it is an objective of the present invention to make it easier to collect vehicle operation information for identifying a failed part of a vehicle without requiring expert knowledge of a diagnostic program to allow easy identification of the failed part of the vehicle.

To achieve the objective of the present invention, there is provided a failure diagnostic system including an electronic control unit, which is installed in a vehicle, and a terminal device, which is communicatable with the electronic control unit. The electronic control unit includes a control program for controlling the vehicle and a diagnostic program for diagnosing each predetermined part of the vehicle and for storing vehicle operation information of the vehicle in the electronic control unit. The terminal device is capable of obtaining the vehicle operation information from the electronic control unit. Furthermore, the terminal device is capable of transmitting functional modification information to the electronic control unit. The functional modification information is usable to achieve functional modification of the diagnostic program and is prepared in association with failure information of the vehicle. The electronic control unit is capable of changing at least one of the vehicle operation information to be stored in the electronic control unit and a condition for storing the vehicle operation information in the electronic control unit by executing the diagnostic program to store the vehicle operation information in the electronic control unit based on the functional modification information transmitted from the terminal device.

To achieve the objective of the present invention, there is also provided an electronic control unit for use in a vehicle. The electronic control unit includes a control program for controlling the vehicle and a diagnostic program for diagnosing each predetermined part of the vehicle and for storing vehicle operation information of the vehicle in the electronic control unit. When the electronic control unit externally receives functional modification information that includes at least one of subject information, which specifies the vehicle operation information to be stored in the electronic control unit, and condition information, which specifies a condition for storing the vehicle operation information in the electronic control unit, the electronic control unit creates at least one of a subject table, which corresponds to the subject information, and a condition table, which corresponds to the condition information. The electronic control unit is capable of changing at least one of the vehicle operation information to be stored in the electronic control unit and the condition for storing the vehicle operation information in the electronic control unit by executing the diagnostic program to store the vehicle operation information in the electronic control unit based on the at least one of the subject table and the condition table.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the present invention will be described with reference to the drawings.

Figure 1:
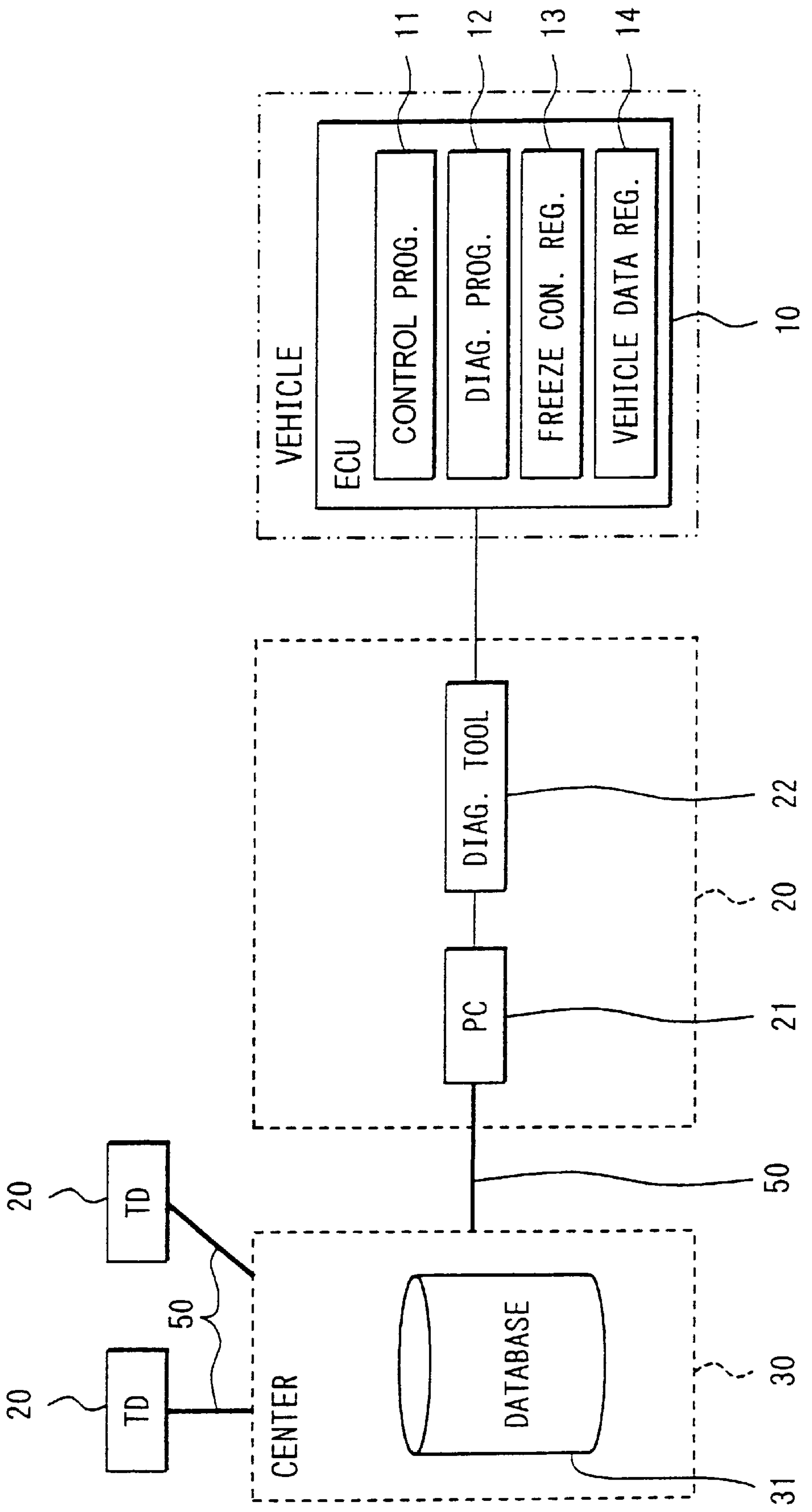
FIG. 1 is a schematic view showing a failure diagnostic system according to an embodiment of the present invention.

FIG. 1 is a schematic diagram showing an overall arrangement of a failure diagnostic system of the embodiment.

The failure diagnostic system of the present embodiment includes an electronic control unit (hereinafter, referred to as "ECU") 10, a terminal device (TD) 20 and a center 30.

The ECU 10 is installed in each corresponding vehicle and stores a control program 11 for controlling the vehicle and a diagnostic program 12 in its memory.

Operation of the vehicle is controlled by the control program 11, and the diagnostic program 12 conducts diagnosis on each corresponding predetermined part of the vehicle. In the event of failure of the vehicle, vehicle data, which corresponds to a PID specified by the regulation, is stored as an FFD along with a corresponding diagnostic fault code at time of storing the diagnostic fault code. Thus, the vehicle data stored by the diagnostic program 12 corresponds to "vehicle operation information".

Besides the vehicle data, which corresponds to the PID, it is sometimes desirable to know other vehicle data, such as a value of an internal variable used in a particular control operation, as vehicle operation information to identify the failed part of the vehicle. Furthermore, besides storing such data at the time of storing the diagnostic fault code, it is sometimes desirable to store such data at predetermined time, at which a predetermined condition is satisfied, or before or after the predetermined time.

Thus, the ECU 10 of the present embodiment has a freeze condition region 13. The freeze condition region 13 is used for setting the vehicle data to be stored and for setting a condition for storing such vehicle data. Based on tables stored in the freeze condition region 13, the diagnostic program 12 stores the vehicle data other than the FFD. A storage region for storing such vehicle data is referred to as a vehicle data region 14.

The terminal device 20 includes a personal computer (PC) 21 and a diagnostic tool 22. To perform operation, the diagnostic tool 22 is connected to an ECU connector of the ECU 10 through a diagnostic communication line. The PC 21 communicates with the ECU 10 through the diagnostic tool 22. Thus, the diagnostic tool 22 is connected to a port of the PC 21 and is operated by a predetermined driver program. The diagnostic tool 22 is a dedicated tool for converting connector signals of the ECU 10 to data of the PC 21, and vice versa.

Automobile dealers, repair shops and others may have the terminal device 20. For example, when a trouble of the vehicle occurs, a user or service personnel performs a predetermined operation on the terminal device 20 to retrieve and display a corresponding diagnostic fault code and vehicle data stored in the ECU 10. Accordingly, the PC 21 has input devices, such as a keyboard and a mouse, and a display device.

The center 30 is implemented as a server system, to which access is made from the terminal device 20 through a communication network 50. The center 30 is also accessible from other terminal devices 20 through the communication network 50. The center 30 has a database 31, so that the data in the center 30 can be shared among the terminal devices 20, which are provided, for example, at the respective dealers.

As described above, it is sometimes desirable to know the vehicle data, such as a value of an internal variable used in a particular control operation, to identify the failed part of the vehicle. Furthermore, besides storing such data at the time of storing the diagnostic fault code, it is sometimes desirable to store such data at a predetermined time, at which a predetermined condition is satisfied, or before or after the predetermined time. In the present embodiment, to meet such a demand, the following feature is provided.

Figure 2:
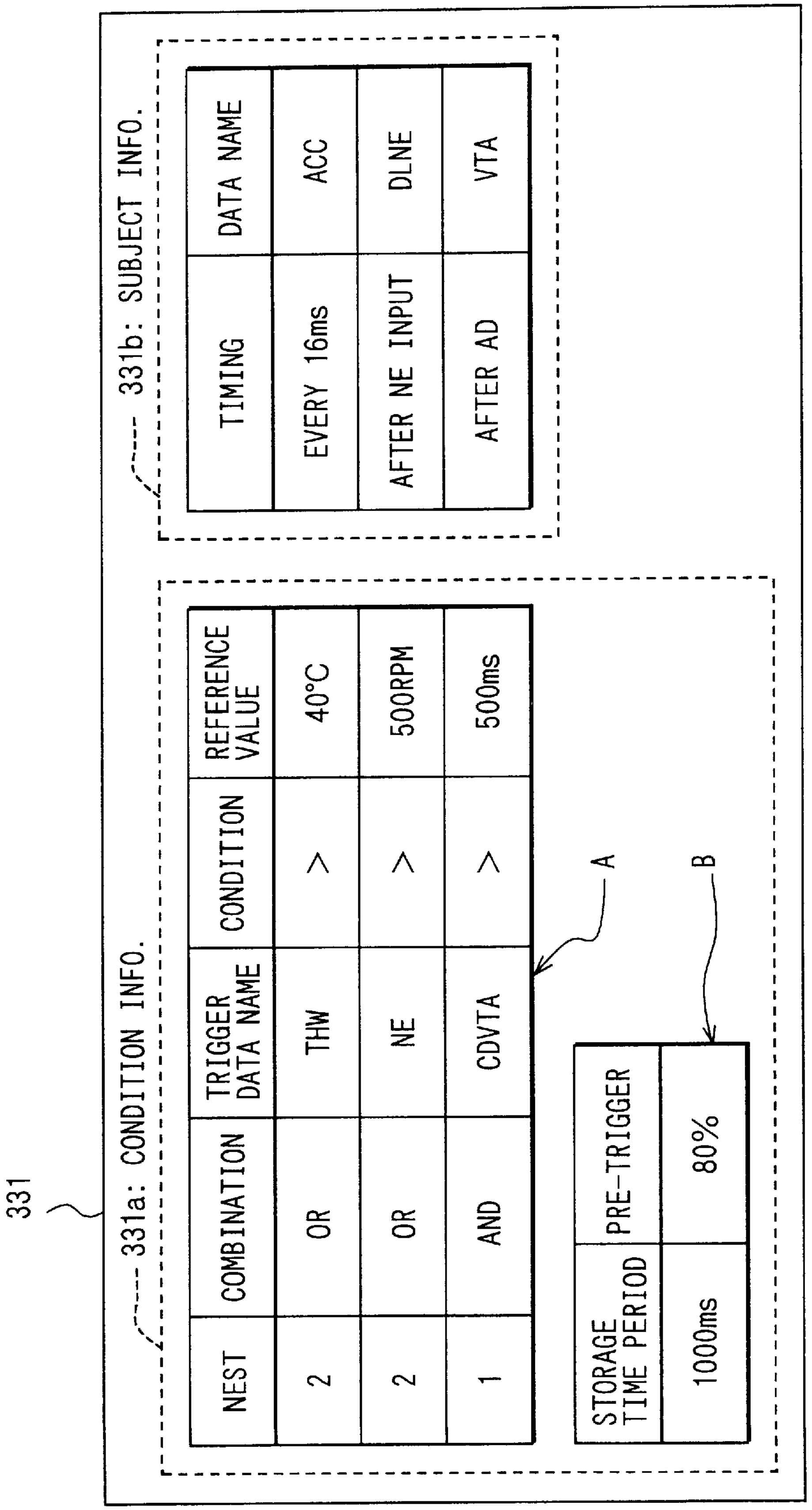
FIG. 2 is a schematic view showing a structure of functional modification information according to the embodiment.

That is, the terminal device 20 outputs functional modification information 331, such as one shown in FIG. 2, to the ECU 10. The functional modification information 331 is stored in the freeze condition region 13 of the ECU 10 in a form of tables, which will be described later.

The functional modification information 331 will be described.

The functional modification information 331 includes condition information 331*a* and subject information 331*b*. The condition information 331*a* specifies conditions for storing the vehicle data. The subject information 331*b* specifies subject vehicle data to be stored (hereinafter, referred to as "subject data").

The condition information 331*a* includes a trigger condition shown in the table indicated by a symbol A (hereinafter, referred to as a table A) and a condition relevant to a storage time period (i.e., a time period for storing data) shown in the table indicated by a symbol B (hereinafter, referred to as a table B).

The trigger condition shown in the table A includes fields of "nest", "combination", "trigger data name", "condition" and "reference value".

The nest field specifies a description of a nesting (hierarchical) structure, which is made of a plurality of conditional expressions. A natural number, such as 1, 2, 3 . . . is entered in each nest field. Here, the greater the natural number, the deeper the level of the nesting structure. The combination field specifies the logic operation between the conditional expressions. A logical product (AND), a logical sum (OR) or the like is entered in each combination field. The trigger data name field, the condition field and the reference value field are combined to form each conditional expression. The vehicle data used in each corresponding conditional expression is entered in the corresponding trigger data name field. An equal sign (=), a greater-than sign (>), a less-than sign (<) or the like is entered in each condition field. A reference value, based on which each corresponding determination is made, is entered in each reference value field.

More specifically, the second row in the table A, immediately below the field names, specifies a condition of "an engine coolant temperature THW>40 degrees Celsius" (the condition will be referred to as "condition 1"). The third row specifies a condition of "an engine speed NE>500 RPM" (the condition will be referred to as "condition 2"). The fourth row specifies a condition of "an abnormality duration counter CDVTA of a throttle sensor>50 ms" (the condition will be referred to as "condition 3").

Satisfaction of the trigger condition shown in the table A is thus determined based on these conditions 1–3. Since the conditions 1 and 2 belong to the same level of the nesting structure indicated with "2", a logical sum of the condition 1 and the condition 2 is calculated first, and a logical product of this logical sum and the condition 3, which belongs to the higher level of the nesting structure indicated with "1", is then calculated. Thereafter, a determination is made based on this result.

Next, the condition relevant to the storage time period shown in the table B will be described.

The condition of the storage time period includes fields of "storage time period" and "pre-trigger".

The storage time period field specifies a time period, over which the subject data is continuously stored or recorded. The pre-trigger field specifies allocation of the storage time period between before and after the time of satisfaction of the trigger condition of Table A.

With reference to the table B, which shows the condition of the storage time period, 1000 milliseconds (ms) is indicated in the storage time period field, and 80% is indicated in the pre-trigger field. This means that the subject data is recorded and is stored over the period of 1000 ms, and the period of 1000 ms is divided into 800 ms, which is before the time of satisfaction of the trigger condition, and 200 ms, which is after the time of satisfaction of the trigger condition.

The subject information 331*b* includes fields of "timing" and "data name".

The timing field specifies timing (or time) of storing the corresponding data. The data name field specifies the subject vehicle data, i.e., the subject data to be stored.

In FIG. 2, the subject information 331*b* indicates the followings. That is, a vehicle acceleration value ACC is stored at every 16 ms. A rate of change of engine speed DLNE is stored each time a rotation angle sensor signal NE is inputted. A throttle sensor voltage VTA is stored each time reading of a sensor voltage AD is completed.

Figure 3:
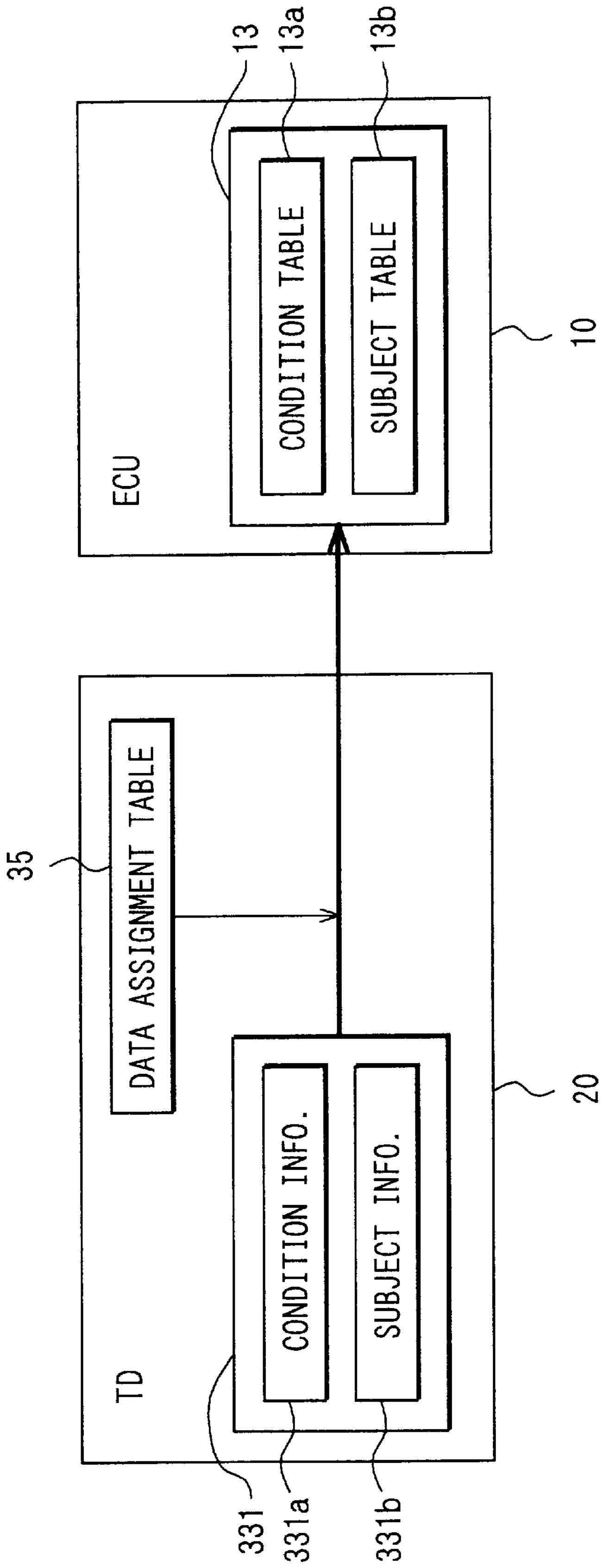
FIG. 3 is a schematic view showing conversion of the functional modification information in a terminal device and storage of data in a form of table in an ECU according to the embodiment.

As shown in FIG. 3, the functional modification information 331 is encoded in the terminal device 20 through use of a data assignment table 35, which is used as a "conversion table," and is then transmitted to the ECU 10. Then, the condition information 331*a* and the subject information 331*b* are stored into the freeze condition region 13 of the ECU 10 as a condition table 13*a* and a subject table 13*b*, respectively.

Now, the operation of the ECU 10 will first be described with the assumption that the ECU 10 has already stored the condition table 13*a* and the subject table 13*b*. Then, operations of the terminal device 20 and of the center 30, which constitute part of the failure diagnostic system together with the ECU 10, will be described.

Figure 4A:
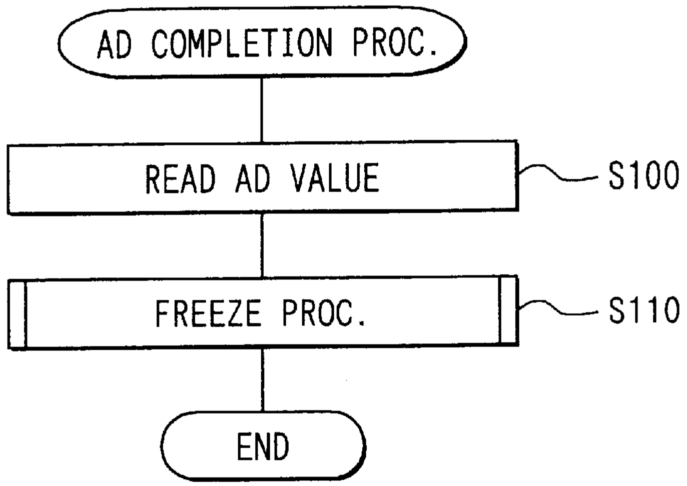
FIG. 4A is a flowchart showing an AD completion process executed in the ECU.
Figure 4B:
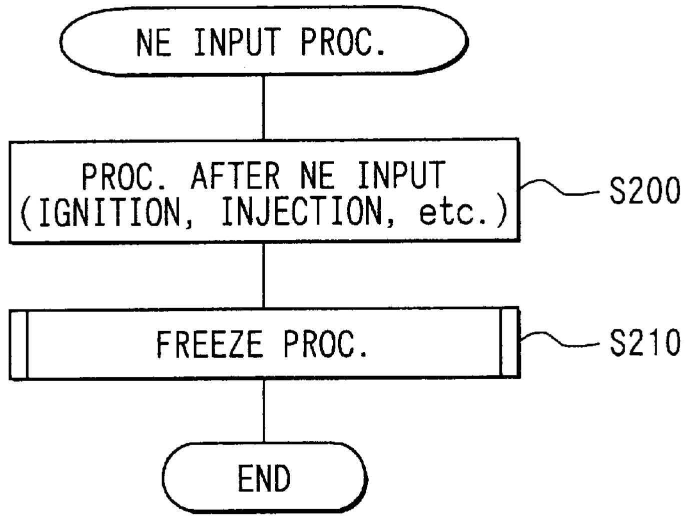
FIG. 4B is a flowchart showing an NE input process executed in the ECU.
Figure 4C:
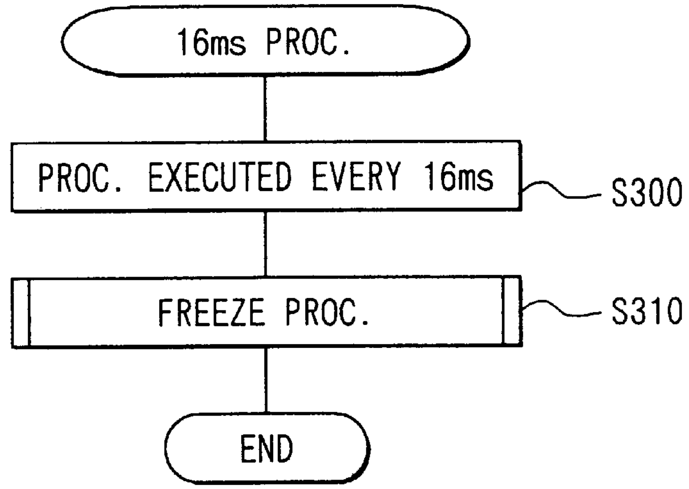
FIG. 4C is a flowchart showing a 16 ms process executed in the ECU.

FIGS. 4A–4C show flowcharts indicating each corresponding process performed by the ECU 10.

FIG. 4A shows an AD completion process, which is executed at predetermined times (or timing). When the process starts, an AD value, which is a sensor voltage, is read (step S100), and then a freeze process is called (step S110). The AD completion process ends when the freeze process ends.

FIG. 4B shows an NE input process, which is executed upon input of the rotation angle sensor signal NE. When the process starts, a series of processes including an ignition process and an injection process are performed (step S200), and then the freeze process is called (step S210). The NE input process ends when the freeze process ends.

FIG. 4C shows a 16 ms process, which is executed at every 16 ms. When the process starts, a control process, which is executed at every 16 ms, is performed (step S300). Then, the freeze process is called (step S310). The 16 ms process ends when the freeze process ends.

Each of steps S100, S200 and S300 in the flowcharts of FIGS. 4A–4C constitutes part of the control program 11 in the ECU 10. Furthermore, each of steps S110, S210 and S310 constitutes part of the diagnostic program 12 in the ECU 10.

In this way, the control program 11 of the ECU 10 is segmented or threaded. Each of the control processes or steps S100, S200, S300 includes a step for calling the freeze process, which is used as a diagnostic process.

Thus, the freeze process will be described. To facilitate understanding of the freeze process, the freeze process will first be briefly described and will be described in greater detail with reference to flowcharts.

In the freeze process, when the freeze condition is not satisfied, the subject data is updated and stored iteratively in the vehicle data region 14 of the ECU 10 at specified times (or timing). When the freeze condition is satisfied, the subject data is frozen by stopping the updating and storing of the subject data.

Figure 5:
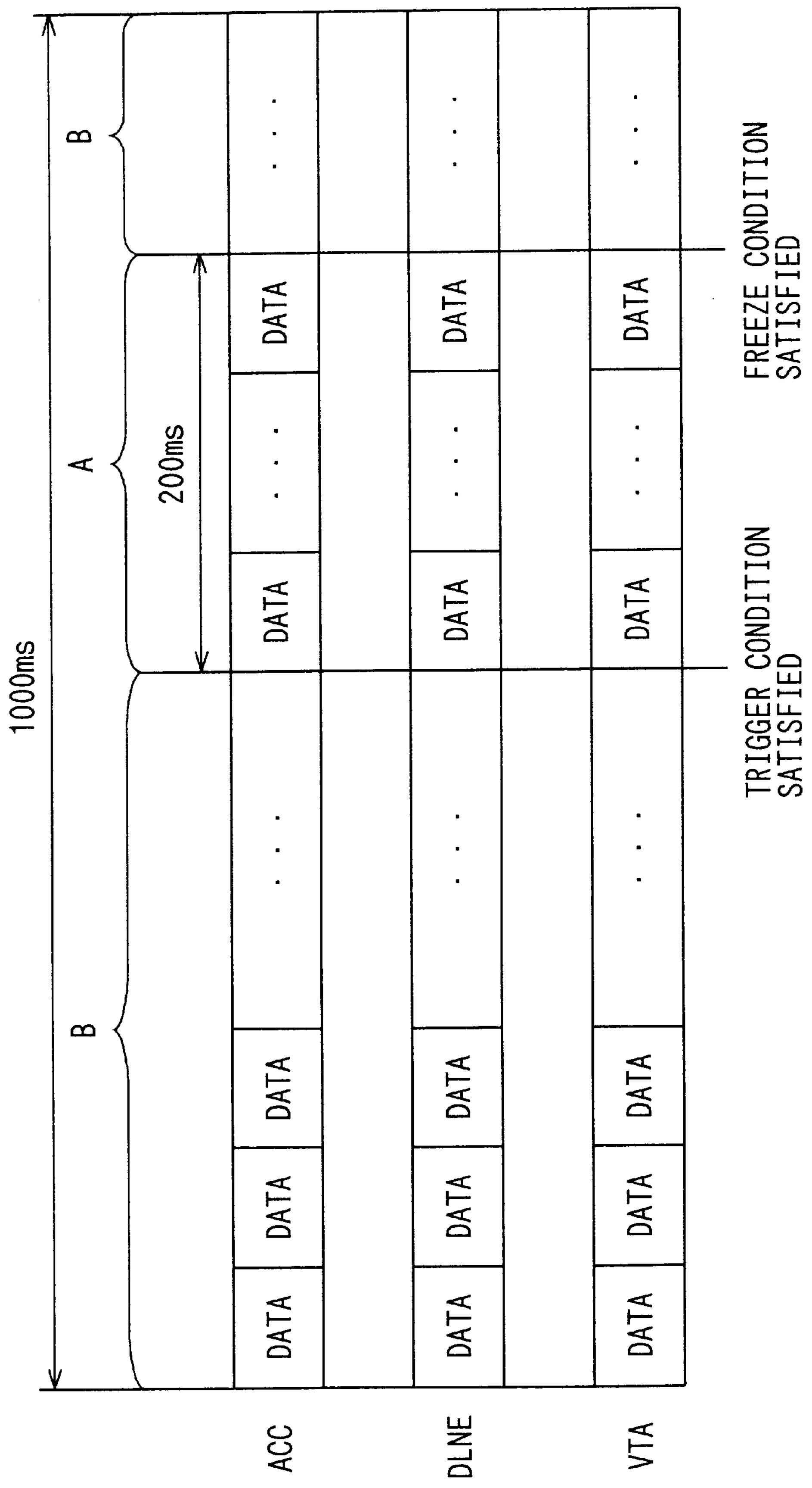
FIG. 5 is a schematic view showing a frozen state of vehicle data under a specific condition according to the embodiment.

In the subject information 331*b* of FIG. 2, each of the vehicle acceleration value ACC, the rate of change of engine speed DLNE, and the throttle sensor voltage VTA is specified as the subject data. Hence, the vehicle data region 14 includes a reserved storage space, which is capable of continuously storing each subject data at the specified times (i.e., the ACC, the DLNE and the VTA are stored at every 16 ms, upon each input of the rotation angle signal NE, and upon each completion of reading of the sensor voltage AD, respectively) up to 1000 ms (see the table B of the condition information 331*a* in FIG. 2). The subject data is updated and stored in this storage space iteratively. Here, the updating and storing of the subject data means that the vehicle data is continuously stored in the reserved storage space, for example, starting at the beginning of the reserved storage space, and when an end of the reserved storage space is reached, the operation returns to the begging of the reserved storage space to overwrite the data. Thus, the latest subject data of 1000 ms is always stored in the reserved storage space. FIG. 5 schematically shows the storage space of each corresponding subject data.

In the present embodiment, the subject data, which is stored during the period of 800 ms before the time of satisfaction of the trigger condition, and the subject data, which is stored during the period of 200 ms after the time of satisfaction of the trigger condition, are frozen (see the table B of the condition information 331*a* in FIG. 2). Thus, satisfaction of freeze condition is determined when 200 ms has elapsed after the time of satisfaction of the trigger condition in a freeze trigger detection process, which is called by the freeze process (see FIG. 5). When the updating and storing of the data is stopped at the time of determination of satisfaction of the freeze condition, the subject data stored during the period of 200 ms after the time of satisfaction of the trigger condition is frozen in a region A of FIG. 5. Furthermore, the subject data stored during the period of 800 ms before the time of satisfaction of the trigger condition is frozen in a region B of FIG. 5.

Now, with reference to flowcharts of FIGS. 6 and 7, the freeze process of the ECU 10 and the freeze trigger detection process, which is called from the freeze process, will be described.

Figure 6:
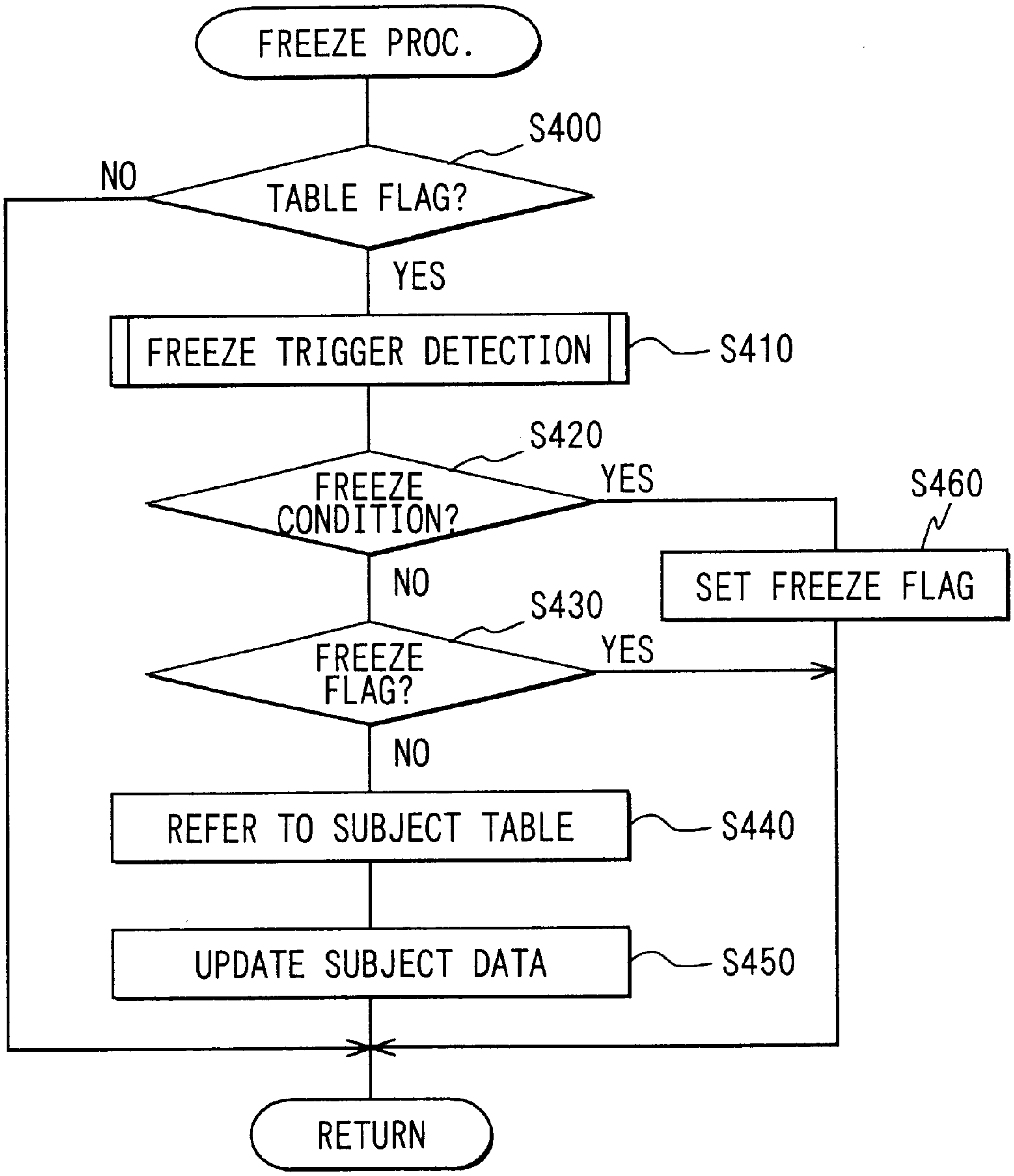
FIG. 6 is a flowchart showing a freeze process executed in the ECU.
Figure 7:
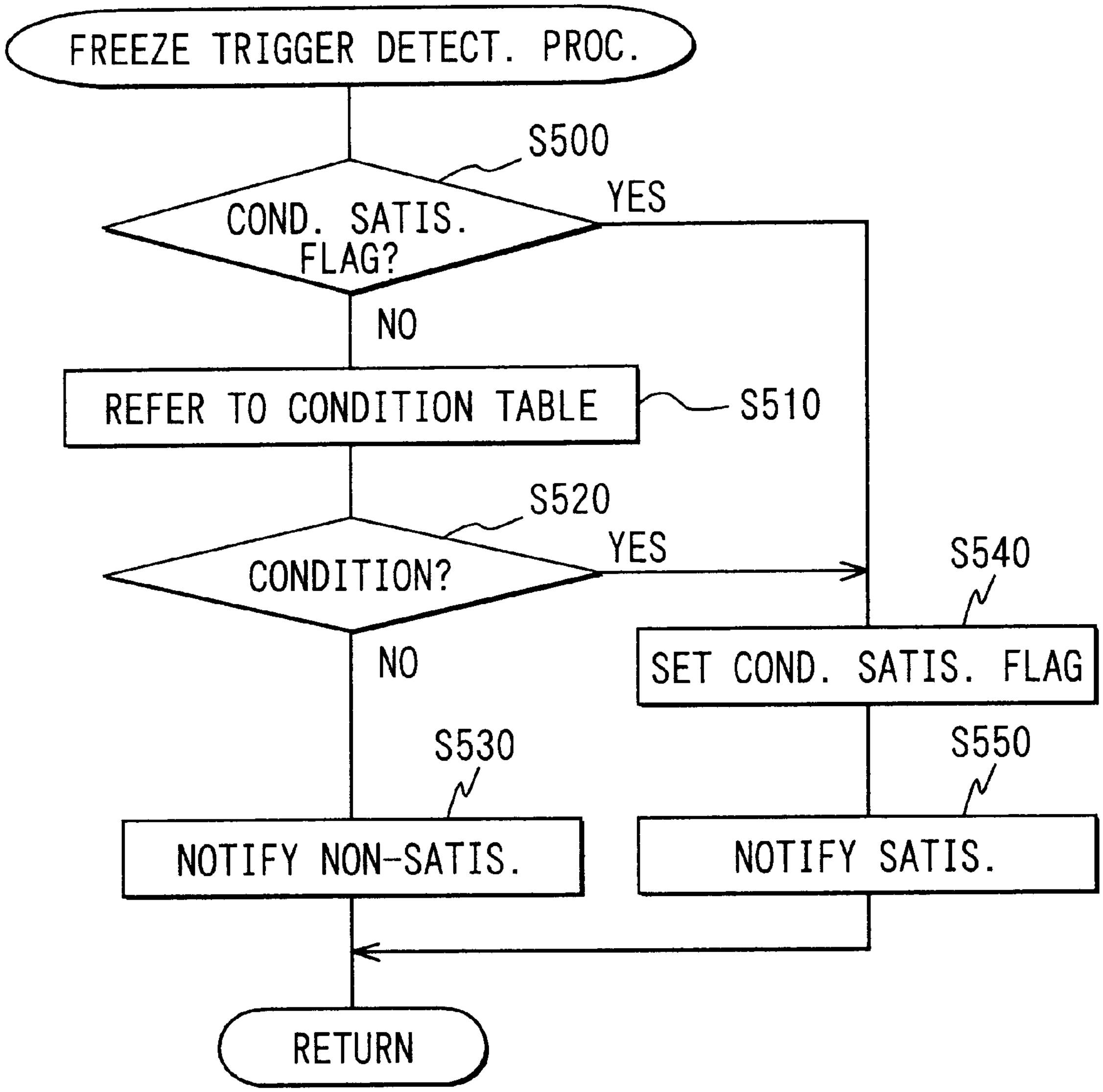
FIG. 7 is a flowchart showing a freeze trigger detection process executed in the ECU.

FIG. 6 shows the flowchart of the freeze process.

Initially, at step S400, it is determined whether a table flag has been set. The ECU 10 sets the table flag when the condition table 13*a* and the subject table 13*b* are stored in the freeze condition region 13 of the ECU 10. This will be described later. Thus, when the condition table 13*a* and the subject table 13*b* are stored in the freeze condition region 13, "YES" is returned at step S400. When the table flag is set (step S400: YES), control proceeds to step S410. On the other hand, when the table flag has not been set (step S400: NO), the freeze process ends without performing the following steps.

At step 410, the freeze trigger detection process is called. This causes notification of satisfaction/non-satisfaction of the freeze condition. Thus, at step S420, it is determined whether the freeze condition has been satisfied. If it is determined that the freeze condition has been satisfied (step S420: YES), a freeze flag is set at step S460, and the freeze operation ends. On the other hand, when it is determined that the freeze condition has not been satisfied (step S420: NO), control moves to step S430.

At step S430, it is determined whether the freeze flag has been set. Once the freeze condition is satisfied (step S420: YES), the freeze flag is set (step S460). Thus, when it is determined that the freeze flag has been set (step S430: YES), the freeze process ends without performing the following steps. On the other hand, when it is determined that the freeze flag has not been set (step S430: NO), the subject table 13*b* is referenced (step S440), and the subject data is updated and stored (step S450). Then, the freeze process ends.

The freeze trigger detection process, which is called at step S410 of the freeze process, will be described with reference to a flowchart of FIG. 7.

First, at step S500, it is determined whether a condition satisfaction flag has been set. The condition satisfaction flag is a flag that is set when the freeze condition has been satisfied. That is, when the freeze condition has been satisfied once before, the condition satisfaction flag is set, and the satisfaction of the condition is notified thereafter. When the condition satisfaction flag has been set (step S500: YES), the condition satisfaction flag is set once again (step S540), and the satisfaction of the condition is notified (step S550). Thereafter, the freeze trigger detection process ends. On the other hand, when it is determined that the condition satisfaction flag has not bee set (step S500: NO), control moves to step S510.

Then, at step 510, the condition table 13*a* is referenced. Then, control moves to step S520. At step S520, it is determined whether the freeze condition has been satisfied. This is accomplished in the following manner. That is, the satisfaction of the freeze condition is determined when 200 ms has elapsed after the time of satisfaction of trigger condition (see FIG. 5). When it is determined that the freeze condition has been satisfied (step S520: YES), the condition satisfaction flag is set (step S540), and the satisfaction of the condition is notified (step S550). Then, the freeze trigger detection operation ends. On the other hand, when it is determined that the freeze condition has not been satisfied (step S520: NO), the non-satisfaction of the freeze condition is notified (step S530), and the freeze trigger detection process ends.

That is, in the present embodiment, the freeze process and the freeze trigger detection process are substantially executed only after the ECU 10 stores the condition table 13*a* and the subject table 13*b* in the freeze condition region 13, and thus the specified vehicle data can be frozen at the specified time without requiring modification of the diagnostic program 12.

As described above, the condition table 13*a* and the subject table 13*b* are formed based on the condition information 331*a* and the subject information 331*b* of the functional modification information 331, which is stored in the database 31 of the center 30.

Figure 8:
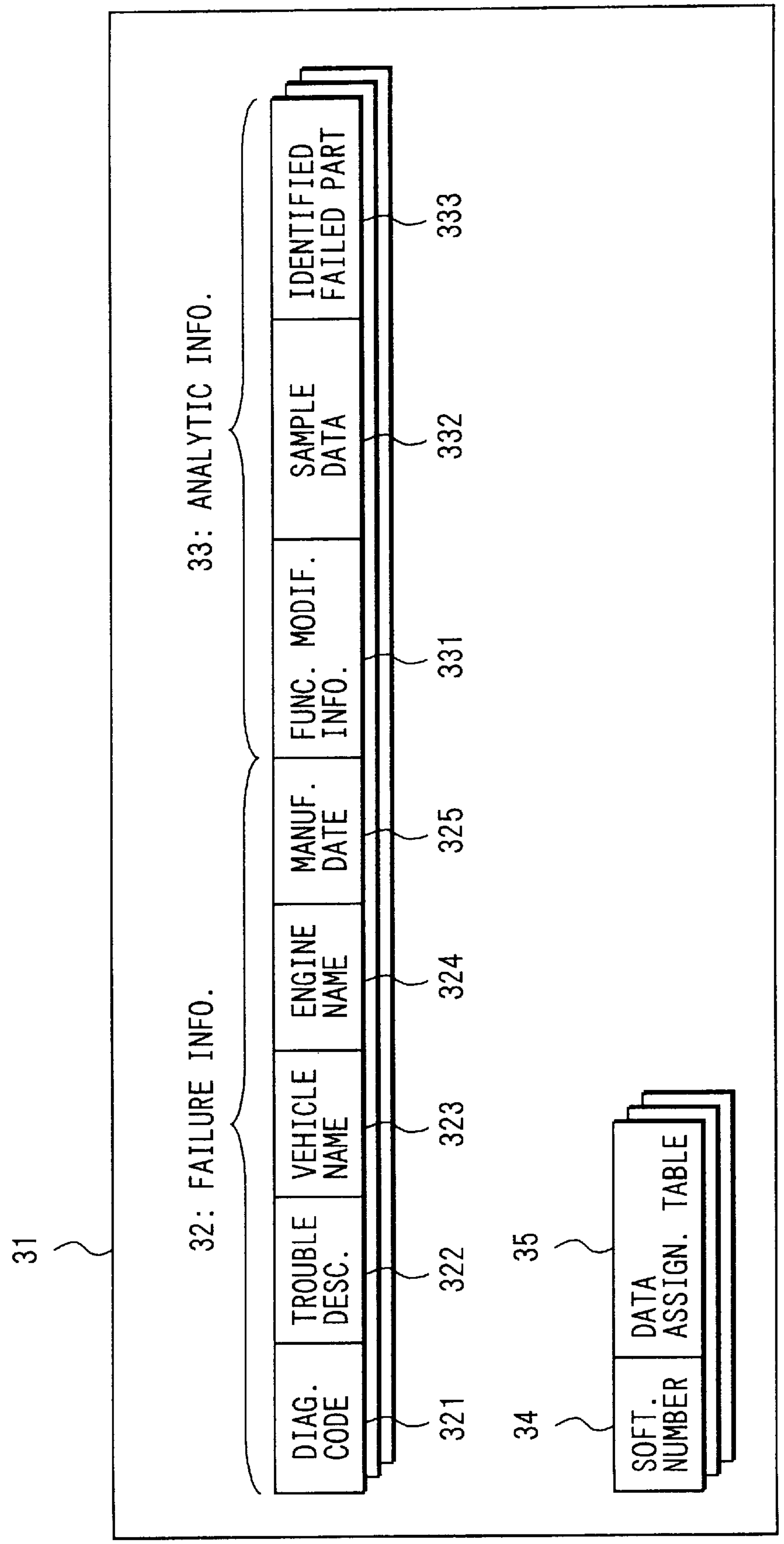
FIG. 8 is a schematic view showing information stored in a database of a center according to the embodiment.

FIG. 8 shows the information stored in the database 31.

The database 31 stores failure information 32 and analytic information 33, which are associated with each other. The database 31 also contains software product numbers (soft.

numbers) 34 and data assignment tables 35, which are associated with each other.

The failure information 32 is used as a search key for searching (or retrieving) the corresponding analytic information 33. The failure information 32 includes a diagnostic fault code 321, a trouble description 322, a vehicle name 323, an engine name 324 and a vehicle manufacturing date 325. The analytic information 33 includes the functional modification information 331 described above, sample data 332 and an identified failed part 333. The sample data 332 is real data acquired by the ECU 10 based on the functional modification information 331. The identified failed part 333 is information that shows the failed part of the vehicle identified based on the sample data 332.

The software product number 34 is a product number assigned to the control program, which is implemented in the ECU 10 and includes the diagnostic program 12 executed by the ECU 10. The data assignment table 35 is a table used to convert the condition information 331*a* and the subject information 331*b* of the functional modification information 331 to corresponding ID codes, which is interpretable by the corresponding diagnostic program 12 (or interpretable by the ECU 10 through execution of the diagnostic program 12), as described above. In other words, the software product number 34 is used as a search key for searching (or retrieving) the corresponding data assignment table 35.

The information stored in the database 31 is described above. The failure information 32 transmitted from the terminal device 20 includes contents similar to those of the failure information 32 stored in the database 31. Thus, the similar contents will be indicated by similar numerals.

As described above, the terminal device 20 transmits the functional modification information 331 to the ECU 10. Furthermore, the terminal device 20 can obtain the analytic information 33 from the database 31 of the center 30 by accessing the center 30 and can obtain the functional modification information 331 from the analytic information 33.

Figure 9:
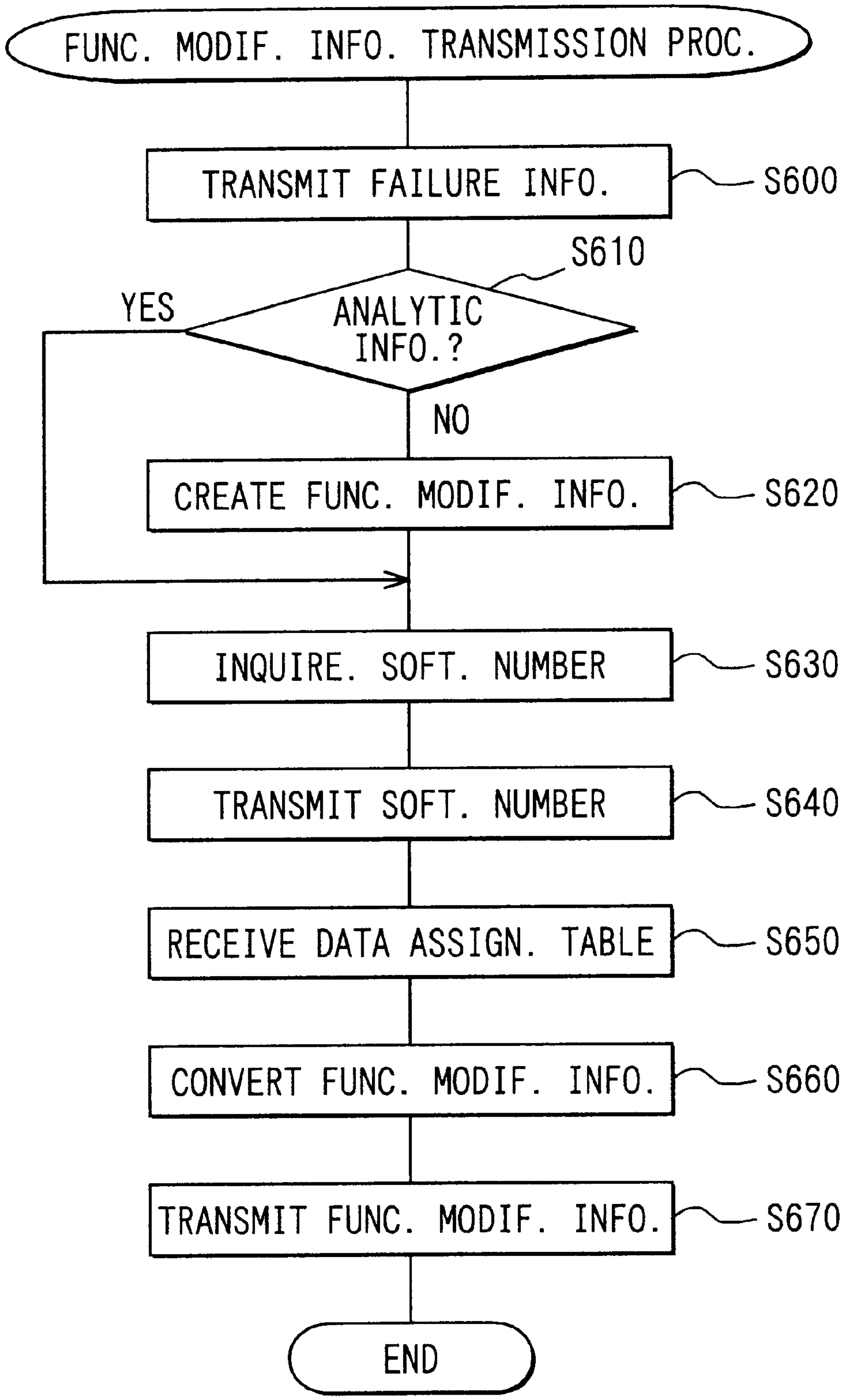
FIG. 9 is a flowchart showing a transmission process for transmitting the functional modification information executed in the terminal device.

A transmission process for transmitting the functional modification information performed in the terminal device 20 will be described with reference to a flowchart of FIG. 9. The transmission process is executed when a predetermined operation is performed through the input device of the terminal device 20.

First, at step S600, the terminal device 20 transmits the failure information 32 to the center 30. This failure information 32 includes the diagnostic fault code 321, the trouble description 322, the vehicle name 323, the engine name 324 and the manufacturing date 325. In this embodiment, the diagnostic fault code 321 and the trouble description 322 are retrieved from the ECU 10 to the terminal device 20, and the vehicle name 323, the engine name 324 and the manufacturing date 325 are inputted by the service personnel. However, the vehicle name 323, the engine name 324 and the manufacturing date 325 can be alternatively retrieved, for example, from the ECU 10 to the terminal device 20.

When the center 30 receives the failure information 32 from the terminal device 20, the corresponding analytic information 33, which corresponds to the received failure information 32, is searched through the database 31. When the corresponding analytic information 33 is found, the center 30 transmits the corresponding analytic information 33 to the terminal device 20. On the other hand, when there is no corresponding analytic information 33, the center 30 does not transmit the analytic information 33 to the terminal device 20.

Thus, at the next step S610, it is determined whether the analytic information 33 has been received from the center 30. When it is determined that the analytic information 33 has been received from the center 30 (step S610: YES), control skips step S620 and moves to step S630. On the other hand, when the analytic information 33 has not been received from the center 30 (step S610: NO), control moves to step S620. At step S620, the functional modification information 331 is created in the terminal device 20, and control moves to step S630. In the terminal device 20, the condition information 331*a* and the subject information 331*b* may be inputted to form the functional modification information 331.

At step S630, the terminal device 20 inquires the software product number (i.e., information about the diagnostic program) 34 of the control program, which is implemented in the ECU 10 and includes the diagnostic program 12, to the ECU 10. In response to the inquiry, the ECU 10 notifies the software product number 34 of the control program to the terminal device 20.

Thus, at the next step S640, the notified software product number 34 is transmitted from the terminal device 20 to the center 30. Then, the center 30 transmits the corresponding data assignment table 35, which corresponds to the notified software product number 34, to the terminal device 20.

At the next step S650, the terminal device 20 receives the data assignment table 35 from the center 30. Then, at the next step S660, the functional modification information 331 is converted to the corresponding ID codes (i.e., interpretable form of the functional modification information 331), which is interpretable by the diagnostic program 12, based on the data assignment table 35 in the terminal device 20. Then, at the next step S670, the converted functional modification information 331 is transmitted from the terminal device 20 to the ECU 10. Then, the transmission process for transmitting the functional modification information ends. FIG. 3 shows the above conversion process for converting the functional modification information 331 to the corresponding ID codes.

Figure 10:
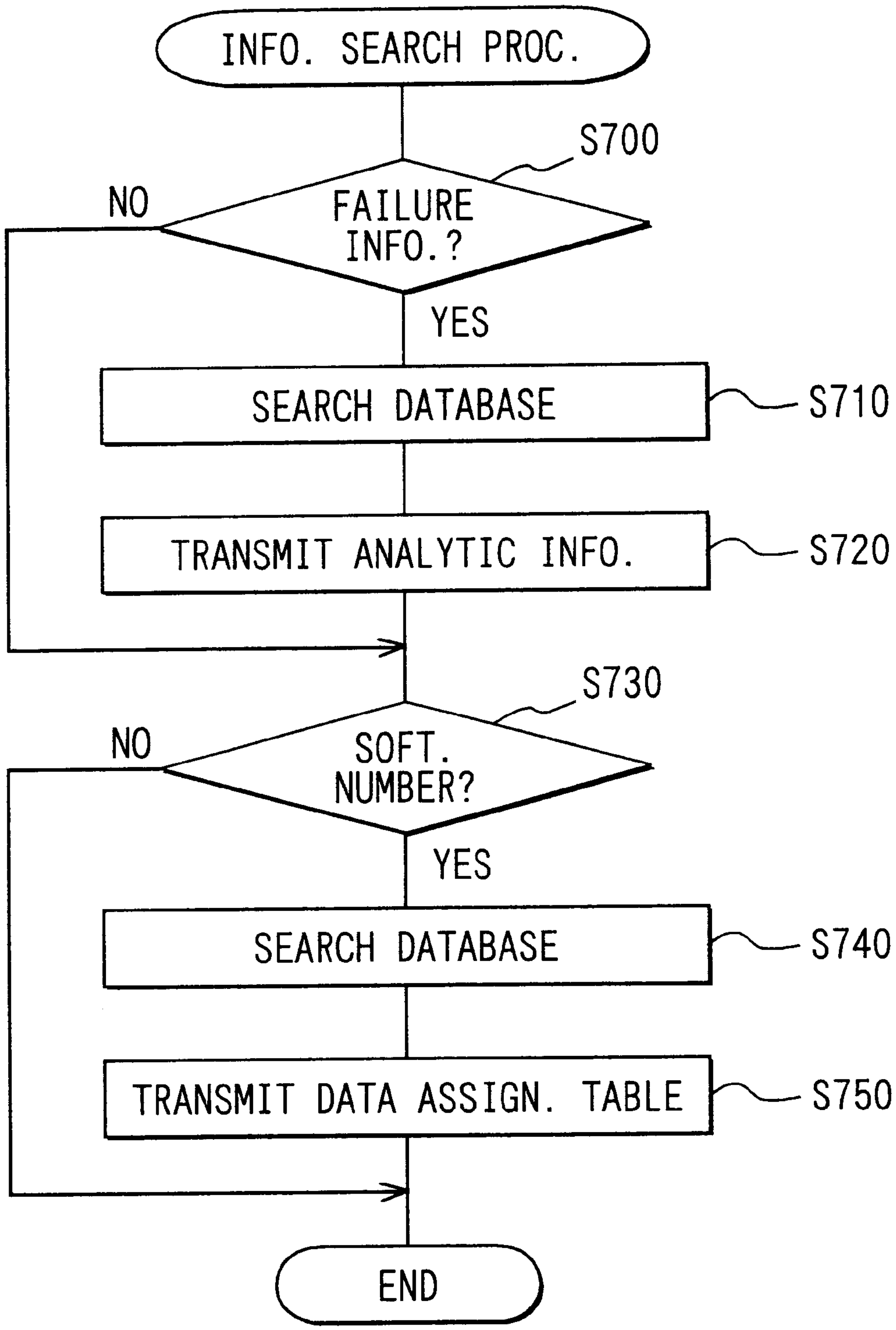
FIG. 10 is a flowchart showing an information search process executed in the center.

Next, an information search process performed in the center 30 in response to the functional modification information transmission process performed by the terminal device 20 will be described with reference to a flowchart of FIG. 10. The information search process is repeated at predetermined time intervals upon establishment of the data communication link between the terminal device 20 and the center 30.

First, at step S700, it is determined whether the failure information 32 has been transmitted from the terminal device 20 to the center 30. When it is determined that the failure information 32 has been transmitted from the terminal device 20 to the center 30, (step S700: YES), control moves to step S710. On the other hand, when the failure information 32 has not been transmitted from the terminal device 20 to the center 30 (step S700: NO), control skips steps S710 and S720 and moves to step S730.

At step S710, the database 31 is searched using the transmitted failure information 32 as a search key. Specifically, the corresponding analytic information 33 is identified using the diagnostic fault code 321, the trouble description 322, the vehicle name 323, the engine name 324 and the manufacturing date 325, which are contained in the transmitted failure information 32, as search keys.

Then, at the next step S720, the corresponding analytic information 33 is transmitted from the center 30 to the terminal device 20, and control moves to step S730. In response to step S720 performed in the center 30, it is determines whether the corresponding analytic information 33 has been received in the terminal device 20 (step S610 in FIG. 9), and the subsequent steps are performed in the terminal device 20 accordingly.

At step S730, it is determined whether the software product number 34 has been transmitted from the terminal device 20 to the center 30. This step is performed in response to step S640 of FIG. 9. When it is determined that the software product number 34 has been transmitted from the terminal device 20 to the center 30 (step S730: YES), control moves to step S740. On the other hand, when it is determined that the software product number 34 has not been transmitted from the terminal device 20 to the center 30 (step S730: NO), control skips steps S740 and S750, and the information search process ends.

At step S740, the database 31 is searched using the transmitted software product number 34 as a search key. Specifically, the corresponding data assignment table 35 is identified by looking up the corresponding software product number 34, which is stored in the database 31.

Then, at the next step S750, the corresponding data assignment table 35 is transmitted from the center 30 to the terminal device 20, and the information search process ends. In response to step S750, the terminal device 20 receives the data assignment table 35 from the center 30 (step S650 in FIG. 9) and converts the functional modification information to the corresponding ID codes (step S660 in FIG. 9).

Figure 11:
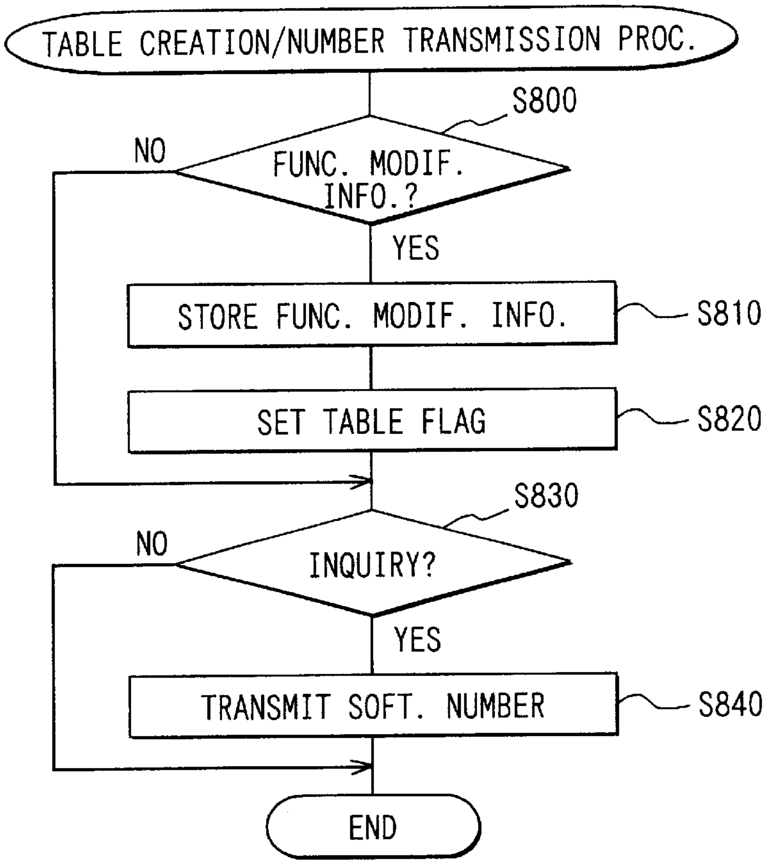
FIG. 11 is a flowchart showing a table creation/product number transmission process executed in the ECU.

A table creation/product number transmission process of ECU 10, which is performed in response to the foregoing functional modification information transmission process, will be described with reference to a flowchart of FIG. 11.

First, at S800, it is determined whether the functional modification information 331 has been received from the terminal device 20. This process is performed in response to step S670 of FIG. 9. When it is determined that the functional modification information 331 has been received (step S800: YES), control moves to step S810. On the other hand, when it is determined that the functional modification information 331 has not been received (step S800: NO), control skips steps S810 and S820 and moves to step S830.

At step S810, the functional modification information 331 is stored in the form of tables. That is, the condition information **331*a* and the subject information 331*b* contained in the functional modification information 331 are stored as the condition table 13*a* and the subject table 13*b*, respectively, in the freeze condition region 13 of the ECU 10. Then, at the next step S820, the table flag is set, and control moves to step S830. When the table flag is set at step S820, YES is returned at step S400 in FIG. 6. Thus, as described above, the specified vehicle data is stored by the diagnostic program 12, which is executed in the ECU 10**, at the specified time.

At step S830, it is determined whether the inquiry of the software product number 34 has been received from the terminal device 20. This step is performed in response to step S630 in FIG. 9. When it is determined that the inquiry of the software product number 34 has been received from the terminal device 20 (step S830: YES), the corresponding software product number 34 is transmitted from the ECU 10 to the terminal device 20 (step S840). Then, the table creation/product number transmission process ends. On the other hands, when it is determined that the inquiry of the software product number 34 has not been received from terminal device 20, the table creation/product number transmission process ends without performing the operation of step S840.

As described above, the condition table **13*a* and the subject table 13*b* are stored in the freeze condition region 13 of the ECU 10, so that it is possible to perform a reproduction test for reproducing the encountered trouble of the vehicle. In the reproduction test, the specified vehicle data is stored in the vehicle data region 14 at the specified time. Thereafter, the service personnel identifies the failed part of the vehicle by retrieving the vehicle data from the terminal device 20. When the reproduction test is performed based on the analytic information 33 transmitted from the center 30, the terminal device 20 receives the sample data 332, which has been previously obtained using the same functional modification information 331, and/or the identified failed part 333, which has been identified using the sample data 332, from the center 30. Thus, in such a case, the failed part of the vehicle can be identified also with reference to the sample data 332 and/or the identified failed part 333 transmitted from the center 30**.

Advantages of the failure diagnostic system according to the embodiment will be described.

In the previous proposal, the functional modification of the diagnostic program 12 is achieved by the expert who individually modifies the diagnostic program 12. Thus, modification of the diagnostic program 12 or addition of a function to the diagnostic program 12 requires relatively long time, creating an inconvenience to the user.

Contrary to this, in the failure diagnostic system according to the above embodiment, the respective functional modification information 331 is previously stored in association with the corresponding failure information 32 in the center 30 (as shown in FIG. 8). Then, based on the failure information 32 transmitted from the terminal device 20, the center 30 transmits the corresponding analytic information 33, which includes the functional modification information 331, to the terminal device 20 (steps S700 to S720 in FIG. 10). Then, the terminal device 20 transmits the functional modification information 331, which is contained in the analytic information 33 transmitted from the center 30, to the ECU 10 (step S670 in FIG. 9). Then, in the ECU 10, the diagnostic program 12 is executed to store the vehicle data based on the functional modification information 331. This allows change of the vehicle data (i.e., the vehicle operation information) and also change of the time for storing the vehicle data (i.e., the condition for storing the vehicle operation information). That is, the specified vehicle data is stored in the vehicle data region 14 of the ECU 10 at the specified time. Thus, the vehicle data can be easily collected, and the failed part of the vehicle can be easily identified.

Furthermore, in the above embodiment, as described above, the respective functional modification information 331 is previously stored in association with the corresponding failure information 32 in the center 30, and the failure information 32 includes the diagnostic fault code 321, the trouble description 322, the vehicle name 323, the engine name 324 and the manufacturing date 325, as shown in FIG. 8. When the failure information 32 is transmitted from the terminal device 20 (step S700 in FIG. 10: YES), the failure information 32 of the center 30, which is identical to the failure information 32 transmitted from the terminal device 20, is searched and is identified, and the corresponding analytic information 33, which is associated with the identified failure information 32, is identified (step S710). Thus, the appropriate search of the analytic information 33, i.e., the appropriate search of the functional modification information 331 is possible.

Furthermore, as shown in FIG. 2, the functional modification information 331 includes the condition information

331*a* and the subject information 331*b*. Thus, when the appropriate functional modification information 331 is not present in the database 31 of the center 30 (step S610 of FIG. 9: NO), the functional modification information 331 is created in the terminal device 20 (step S620). That is, unlike the known program, the functional modification information 331 of the present embodiment does not require any programming for defining a procedure of the program, so that the functional modification information 331 can be easily created using the terminal device 20. Specifically, the creation of the functional modification information 331 only requires simple input operation of the corresponding information in the corresponding table, as shown in FIG. 2. That is, the functional modification information 331 can be created in a manner similar to input operation of information in a data record.

Furthermore, the condition information 331*a* and the subject information 331*b* of the functional modification information 331 are stored in the freeze condition region 13 of the ECU 10 in the form of condition table 13*a* and in the form of the subject table 13*b*, respectively. In the ECU 10, the diagnostic program 12 freezes the vehicle data with reference to the condition table 13*a* and the subject table 13*b* stored in the freeze condition region 13 (step S440 in FIG. 6 and step S510 in FIG. 7). In other words, the diagnostic program 12 calls the freeze process (steps S110, S210 and S310 in FIGS. 4A–4C) in each control process. The freeze process is executed only when the condition table 13*a* and the subject table 13*b* are stored in the freeze condition region 13, i.e., only when the table flag is set (step S400 in FIG. 6). Thus, the change of the subject data and the change of the time for storing the subject data will not cause change of the diagnostic program 12. As a result, it is not required to restore the diagnostic program 12 to the original state after the failed part of the vehicle is identified.

Furthermore, the functional modification information 331 is stored in the database 31 of the center 30. Thus, the functional modification information 331 can be shared among the various terminal devices 20, so that a storage space of each terminal device 20 can be reduced, and the know-how of the failure analysis can be shared with more people.

Furthermore, in the above embodiment, the terminal device 20 converts the functional modification information 331 to the corresponding ID codes (step S660 in FIG. 9), which are interpretable by the diagnostic program 12, and the terminal device 20 transmits the ID codes to the ECU 10 (step S670). Thus, the same functional modification information 331 can be commonly used even when different diagnostic programs 12 are used to diagnose different types of vehicles (e.g., different vehicle models or different vehicle grades). As a result, it is not required to provide the same functional modification information 331 in different forms to diagnose different types of vehicles. Specifically, in the above embodiment, the terminal device 20 inquires the software product number 34 to the ECU 10 (step S630 in FIG. 9). When the software product number 34 is transmitted from the ECU 10 to the terminal device 20 (step S840 in FIG. 11), the corresponding software product number 34 is transmitted from the terminal device 20 to the center 30 (step S640 in FIG. 9). Then, the center 30 searches the data base 31 using the software product number 34 as the search key (step S740 in FIG. 10). Thereafter, the corresponding data assignment table 35 is transmitted from the center 30 to the terminal device 20 (step S750). As described above, the data assignment table 35 is stored in the database 31 of the center 30, so that each data assignment table 35 can be shared among the various terminal devices 20.

In the reproduction test performed by the ECU 10 based on the functional modification information 331, the specified vehicle data is stored in the vehicle data region 14 at the specified time. Thus, the service personnel can easily identify the failed part of the vehicle. Furthermore, in the case where the reproduction test is performed based on the analytic information 33 transmitted from the center 30, the sample data 332, which is obtained using the functional modification information 331 transmitted from the terminal device 20 as the search key, and the identified failed part 333, which is identified based on the sample data 332, are transmitted from the center 30 to the terminal device 20. Thus, in this case, the failed part of the vehicle can be easily identified with a higher probability with reference to the sample data 332 and the identified failed part 333.

The present invention is not limited to the above embodiment and can be embodied in various forms.

Figure 12:
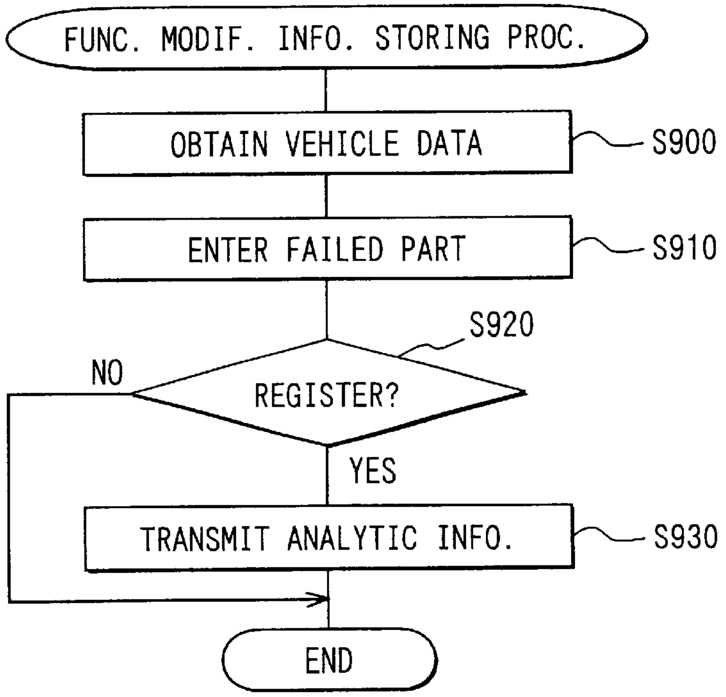
FIG. 12 is a flowchart showing a functional modification information storing process executed in the terminal device.

For example, after the failed part of the vehicle is identified based on the vehicle data stored in the vehicle data region 14 of the ECU 10, the analytic information 33 can be transmitted from the terminal device 20 to the center 30 to update the database 31 of the center 30. By way of example, the terminal device 20 can perform a functional modification information storing process shown in FIG. 12. Here, the terminal device 20 stores or causes to externally store the functional modification information 331 based on a relationship between the functional modification information 331 and the failure information 32. That is, if the relationship between the functional modification information 331 and the failure information 32 is not found in the database 31 of the center 30, the terminal device 20 stores the functional modification information 331 in the database 31 of the center 30.

When this process starts, the vehicle data is obtained from the ECU 10 (step S900). Next, the failed part of the vehicle is identified by the service personnel based on the vehicle data in the manner described above. Thereafter, the service personnel or user enters the identified failed part of the vehicle to the terminal device 20 (step S910). Then, it is determined whether the analytic information 33, which includes the functional modification information 331, the obtained vehicle data 332 and the identified failed part 333, needs to be registered (step S920). This determination can be made based on a corresponding instruction inputted by the service personnel. Alternatively, this determination can be automatically made by determining whether the current combination of the failure information 32 and the analytic information 33 is present in the database 31 of the center 30. For example, when the functional modification information 331 is created in the terminal device 20, YES is returned at step S920. Thus, when it is determined that the analytic information 33 needs to be registered (step S920: YES), the analytic information 33 is transmitted from the terminal device 20 to the center 30 (step S930). Thereafter, the functional modification information storing process ends. On the other hand, when it is determined that the analytic information 33 needs not to be registered (step S920: NO), the functional modification information storing process ends without performing the operation of step S930. When the analytic information 33 is transmitted from the terminal device 20 to the center 30, the center 30 stores the analytic information 33 in association with the corresponding failure information 32, which has been previously transmitted from the terminal device 20 and has been stored in the center 30. Alternatively, the analytic information 33 can be transmitted to the center 30 without performing the operation of step S920, and it can be determined whether the transmitted analytic information 33 needs to be registered in the database 31 based on the relationship between the failure information 32 and the analytic information 33 at the center 30.

A storage space size of the vehicle data region 14 (i.e., a size of the storage space available for storing the vehicle operation information) of the ECU 10 is limited. Thus, the terminal device 20 can be constructed to obtain the storage space size of the vehicle data region 14 of the ECU 10 by inquiring the storage space size of the vehicle data region 14 to the ECU 10. For example, when the functional modification information 331 is created in the terminal device 20, it is convenient to know the storage space size of the vehicle data region 14 in advance. It is also possible to store the storage space size of the vehicle data region 14 of the ECU 10 in the center 30, so that the terminal device 20 can obtain the storage space size of the vehicle data region 14 of the ECU 10 from the center 30. With such an arrangement, which allows the terminal device 20 to obtain the storage space size of the vehicle data region 14 of the ECU 10, the storage space size of the vehicle data region 14 of the ECU 10 can be used as a search key or search condition for searching the corresponding analytic information 33.

Additional advantages and modifications will readily occur to those skilled in the art. The invention in its broader terms is therefore, not limited to the specific details, representative apparatus, and illustrative examples shown and described.

What is claimed is:

1. A failure diagnostic system comprising:

an electronic control unit installed in a vehicle, wherein the electronic control unit includes:

a control program for controlling the vehicle; a diagnostic program for diagnosing at least one each predetermined part of the vehicle and for storing vehicle operation information of the vehicle in the electronic control unit; and a terminal device, which communicates with the electronic control unit, wherein:

the terminal device obtains the vehicle operation information from the electronic control unit;

the terminal device transmits functional modification information to the electronic control unit, wherein the functional modification information is used to achieve functional modification of the diagnostic program and is prepared in association with failure information of the vehicle; and the electronic control unit changes at least one of the vehicle operation information to be stored in the electronic control unit and a condition for storing the vehicle operation information in the electronic control unit by executing the diagnostic program to store the vehicle operation information in the electronic control unit based on the functional modification information transmitted from the terminal device; and a center, which performs data communication with the terminal device through a communication network, wherein:

the center includes a database of the functional modification information;

the terminal device transmits the functional modification information to the center after a failed part of the vehicle is identified based on the vehicle operation information; and the center updates the database based on the functional modification information received from the terminal device.

2. The failure diagnostic system according to claim 1, wherein the failure information includes at least one of:

a diagnostic fault code; and a trouble description, which describes a trouble of the vehicle.

3. The failure diagnostic system according to claim 1, wherein the functional modification information includes at least one of:

subject information, which specifies the vehicle operation information to be stored in the electronic control unit; and condition information, which specifies the condition for storing the vehicle operation information in the electronic control unit.

4. The failure diagnostic system according to claim 3, wherein the terminal device newly creates the functional modification information when a user specifies the at least one of the subject information and the condition information.

5. The failure diagnostic system according to claim 3, wherein:

the electronic control unit creates at least one of:

a subject table, which corresponds to the subject information; and a condition table, which corresponds to the condition information; and when the at least one of the subject table and the condition table is created, the diagnostic program is executed to store the vehicle operation information based on the at least one of the subject table and the condition table.

6. The A failure diagnostic system according to claim 1, wherein the terminal device obtains the functional modification information from the center.

7. The failure diagnostic system according to claim 6, wherein the center searches the corresponding functional modification information stored in the database based on the failure information transmitted from the terminal device and transmits the corresponding function modification information to the terminal device.

8. The failure diagnostic system according to claim 6, wherein the terminal device stores the functional modification information based on a relationship between the functional modification information and the failure information.

9. The failure diagnostic system according to claim 8, wherein the terminal device stores the functional modification information together with the vehicle operation information, which is obtained through use of the functional modification information.

10. The failure diagnostic system according to claim 8, wherein the terminal device stores the functional modification information and the vehicle operation information.

11. The failure diagnostic system according to claim 6, wherein:

the terminal device converts the functional modification information to an interpretable form, which is interpretable by the diagnostic program of the electronic control unit; and the terminal device transmits the interpretable form of the functional modification information to the electronic control unit.

12. The failure diagnostic system according to claim 11, wherein:

the terminal device inquires information about the diagnostic program to the electronic control unit and obtains a corresponding conversion table based on the information about the diagnostic program; and the terminal device converts the functional modification information to the interpretable form through use of the corresponding conversion table.

13. The failure diagnostic system according to claim 12, wherein:

the center stores the conversion table;

the terminal device transmits the information about the diagnostic program to the center and obtains the corresponding conversion table, which corresponds to the information about the diagnostic program, from the center.

14. The failure diagnostic system according to claim 6, wherein the terminal device obtains a size of a storage space of the electronic control unit, which is available for storing the vehicle operation information, from the electronic control unit.

15. The failure diagnostic system according to claim 14, wherein the terminal device obtains the size of the storage space of the electronic control unit, which is available for storing the vehicle operation information, from the center.

16. The electronic control unit according to claim 1, wherein when information indicative of a relationship between the functional modification information and the failure information is not present in the database of the center, the terminal device transmits the functional modification information to the center.

17. The electronic control unit according to claim 1, wherein when information indicative of a relationship between the functional modification information and the failure information is not present in the database of the center, the center adds the function modification information, which is received from the terminal device, into the database of the center.

18. An electronic control unit for use in a vehicle, wherein the electronic control unit includes:

a control program for controlling the vehicle; and a diagnostic program for diagnosing each predetermined part of the vehicle and for storing vehicle operation information of the vehicle in the electronic control unit, wherein:

when the electronic control unit externally receives functional modification information that includes at least one of subject information, which specifies the vehicle operation information to be stored in the electronic control unit, and condition information, which specifies a condition for storing the vehicle operation information in the electronic control unit, the electronic control unit creates at least one of a subject table, which corresponds to the subject information, and a condition table, which corresponds to the condition information; and the electronic control unit changes at least one of the vehicle operation information to be stored in the electronic control unit and the condition for storing the vehicle operation information in the electronic control unit by executing the diagnostic program to store the vehicle operation information in the electronic control unit based on the at least one of the subject table and the condition table.

19. The electronic control unit according to claim 18, wherein the electronic control unit externally transmits information about the diagnostic program when the electronic control unit externally receives an inquiry about the diagnostic program.

20. A diagnostic method comprising:

inputting functional modification information into a control unit for controlling a vehicle, wherein the functional modification information is used to achieve functional modification of a diagnostic program for diagnosing at least one predetermined part of the vehicle and for storing vehicle operation information of the vehicle;

changing at least one of the vehicle operation information to be stored and a condition for storing the vehicle operation information by executing the diagnostic program in the control unit to store the vehicle operation information based on the functional modification information;

outputting the vehicle operation information from the control unit;

identifying, outside the control unit, a failed part of the vehicle based on the vehicle operation information;

determining, outside the control unit, whether information indicative of a relationship between the functional modification information and failure information of the failed part of the vehicle is present in a database of a center after the identifying of the failed part of the vehicle based on the vehicle operation information; and associating the functional modification information with the failure information and adding the functional modification information together with the failure information into the database at the center when it is determined that the information indicative of the relationship between the functional modification information and the failure information is not present in the database of the center.

* * * * *